Aug. 23, 1949. R. L. COPELAND Re. 23,143

AILERON-RUDDER TAB LINKAGE

Original Filed March 20, 1946

Inventor

RALPH L. COPELAND

By Strauch & Hoffman

Attorneys

Patented Aug. 23, 1949 Re. 23,143

UNITED STATES PATENT OFFICE 23,143

AILERON-RUDDER TAB LINKAGE

Ralph L. Copeland, Piedmont, Calif.

Original No. 2,445,940, dated July 27, 1948, Serial No. 655,792, March 20, 1946. Application for reissue February 23, 1949, Serial No. 77,801

7 Claims. (Cl. 244—83)

This invention relates to aircraft, and more particularly to improvements in controls for maneuvering the aircraft during flight.

The provision of auxiliary control surfaces at the trailing edges of normal control surfaces, such as ailerons, elevators, and the rudder, is a common practice. These auxiliary control surfaces are generally termed flaps or tabs. Such auxiliary surfaces have been provided in the past in order to obtain certain desired effects. They have been used, for example, to assist in trimming the aircraft for normal flight when the main control surfaces are in their neutral position. They have also been used as compensating surfaces to reduce the amount of force necessary to move the main control surfaces. Such auxiliary control surfaces also have been used to furnish the motivating force for moving the main control surfaces to which they are attached. My invention pertains particularly to the latter type of use, whereby the manual positioning of the auxiliary control surface causes it to be operated upon by the wind stream so as to move the main control surface in the desired direction.

In maneuvering an aircraft during flight it is important that the pilot properly co-ordinate the movements of his controls. This is particularly true in the case of the ailerons and the rudder, since these two control surfaces are used together in making a turn. As is well known, the improper co-ordination of the use of the controls for the ailerons and rudder will result in a skid or a slip. While the elevators may also be used during a turn, as for instance to lower the nose to maintain flying speed, the elevators also serve to control the position of the plane about its lateral axis, and there is a substantial number of maneuvers wherein the elevators are used without the rudder or ailerons, so that co-ordination between all three controls is not always quite as important as co-ordination between the controls for the ailerons and the rudder.

One of the aims of the industry has been to simplify the necessary controls, so that their number can be reduced to a minimum to make it easier for the average individual to fly an airplane. To this end, attempts have been made in the past to reduce the number of controls to be operated by the pilot by having one control member govern the action of more than one set of control surfaces. One such method of simplification of control is shown, for instance, by the patent to Weick, 2,110,516, issued on March 8, 1938. That patent illustrates the use of a single control for both the ailerons and the rudder, so that as the control wheel is turned to the right or left, to make a corresponding turn, both the ailerons and the rudder are simultaneously moved in the required direction. The necessity of separate controls, such as a rudder bar connected to the rudder, is thereby eliminated.

In accordance with my invention, instead of connecting the rudder to the aileron control, I employ a rudder tab hinged at the rear portion of the rudder and connected to the aileron control for simultaneous operation thereof. The connections between the tab and the aileron control are such that when the ailerons are moved to give a right bank the rudder tab is deflected or moved toward the left. Movement of the tab toward the left causes the rudder itself to be deflected toward the right as is necessary to initiate a right turn. This movement of the rudder toward the right is independent of any other applied force except the force applied thereto by the tab itself. In further accordance with my invention, however, I employ a separate and independent rudder control system. The rudder control system is actuated by an ordinary set of rudder pedals or the like and thus gives full control of the position of the rudder independent of the aileron control. My system has the advantage that in normal flight and in ordinary circumstances the pilot need not use the rudder pedals to control the rudder, since the rudder is actuated by the tab in co-ordination with the aileron controls. As is well known, however, there are many circumstances, such as during takeoff or landing et cetera in a single engine airplane where right or left rudder must be applied independently of any aileron action, for example, to compensate for the differences in engine torque. During taxiing on the ground, full use of the rudder independent of aileron action is also frequently required. My system thereby provides a coordination of controls between the rudder and ailerons so that the rudder need not be used, but at the same time provides an independent control for the rudder which may be used without affecting the ailerons.

It is therefore the primary objective of my invention to provide a novel and improved control system for airplanes.

It is another object of my invention to provide novel means for co-ordinating the action of control surfaces which are operable to simultaneously rotate the airplane about two different axes.

It is another object of my invention to provide a novel co-ordinated control between the aileron and rudder systems of an airplane.

Another object of my invention is the provision of a novel control system for an airplane comprising a connection between a rudder tab and the aileron control system together with a conventional rudder control.

Other objects will become apparent as the description proceeds in connection with the accompanying drawings, wherein.

Figures 1, 2, 3:
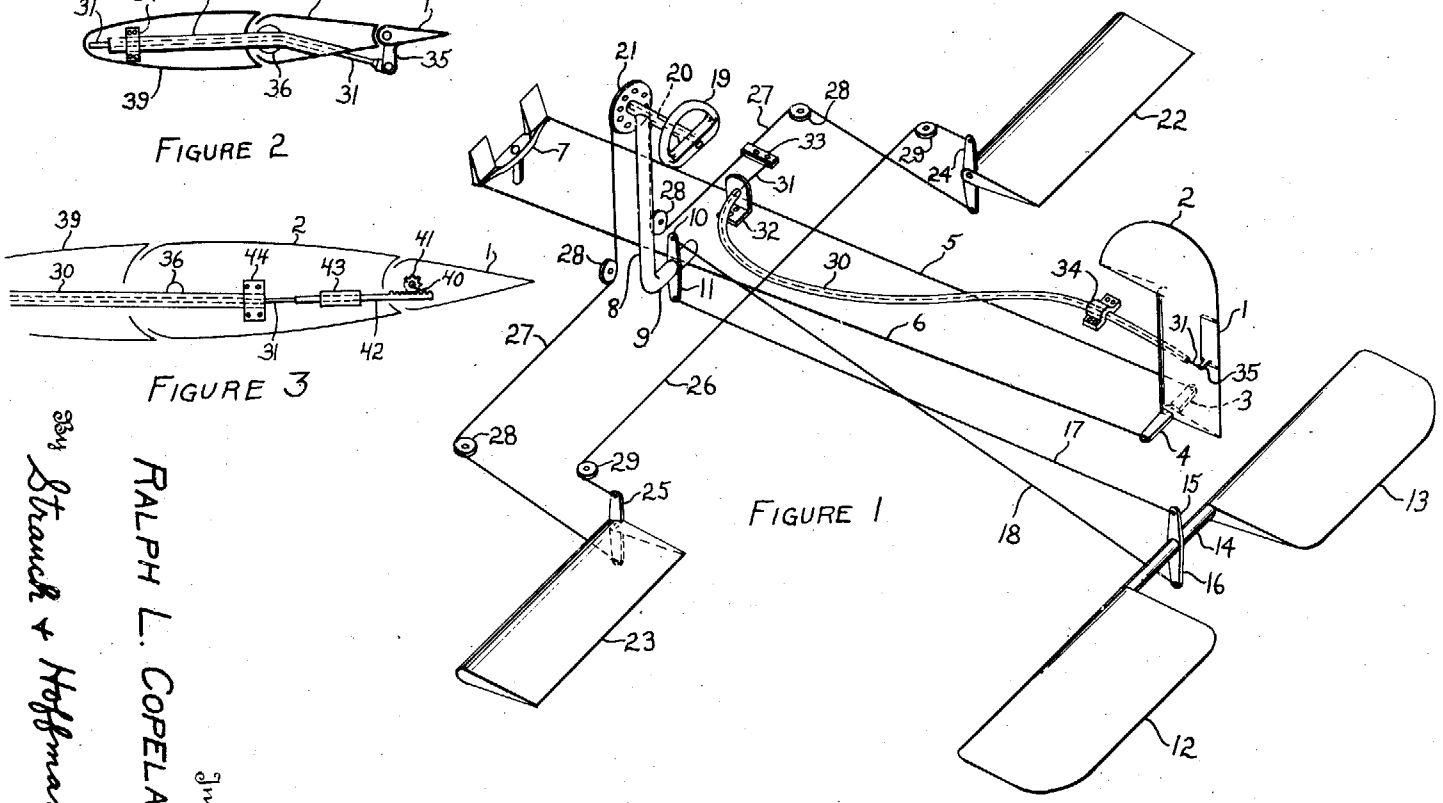
Figure 1 is a schematic diagram of the control system of an airplane which employs an embodiment of my invention.
Figure 2 is a schematic diagram of a horizontal section through the stabilizer, rudder and tab to illustrate the details of one type of control means for the rudder tab.
Figure 3 is a partial view similar to Figure 2, but illustrating another type of control means for the rudder tab.

As shown in Figure 1, the control system, except for my novel means for actuating the rudder tab 1 and the rudder 2, is conventional. The rudder 2 is connected through levers 3 and 4 and control wires 5 and 6 to a rudder bar 7 in a cockpit. A wheel type control post 8 is pivoted about a transverse horizontal axis which is coaxial with its horizontal disposed portion 9 and which has affixed to it levers 10 and 11. Elevators 12 and 13 are affixed to a shaft 14 for simultaneous rotation about a horizontal transverse axis and levers 15 and 16 on shaft 14 are connected to levers 10 and 11 by control wires 17 and 18. An aileron control wheel 19 is affixed to a shaft 20 which is journalled for rotation at the upper end of the control post 8. A pulley 21 is also affixed to the shaft 20 so as to rotate in the same direction as the control wheel 19 is moved. Ailerons 22 and 23 are mounted for rotation about a transverse horizontal axis in any conventional manner and have affixed thereto levers 24 and 25 having oppositely extending arms to which are connected control wires 26 and 27. The control wire 27 passes around the pulley 21 in frictional engagement therewith and extends to the lower arms of the levers 24 and 25 through a series of sheaves or pulleys 28. The upper arms of the levers 24 and 25 are connected by the control wire 26, which passes through pulleys 29. The above-described control system will be recognized as conventional in that turning of the wheel 19 actuates the ailerons; movement of the control post 8 forward and backward actuates the elevators; and movement of the rudder bar 7 actuates the rudder.

In order to provide for co-ordinated movement of the rubber tab 1 together with movement of the ailerons 22 and 23, I have illustrated, for purposes of example only, two types of construction for accomplishing this end. A flexible cable of the type generally comprising an outer coiled wire sheath 30 and actuating wire 31 passing through the central passageway of the sheath is shown in Figures 1, 2 and 3. The sheath 30 is advantageously clamped or fastened to the aircraft structure at any desired number of points in order to prevent vibration thereof. In the illustrated types of construction it is also connected to a fixed portion of the aircraft structure by means of a mounting 32 at a point adjacent where the wire 31 is connected to the control cable 27 as by a clamping device 33. Force transmitting control devices of the type indicated by the reference numbers 31 and 32 are well known and are sometimes designated by the trade name "Bowden" cable. As previously described, the control system for the rudder tab 1 is such that the annular position of the rudder tab with respect to the rudder 2 is unaffected by movements of the rudder 2. For this reason, in the construction shown in Figures 1 and 2, the sheath 30 is not shown clamped to the airplane near its rear end in the movable rudder 2, but is shown clamped at 34 at a point such as within the stabilizer 39 and remote from the rudder 2. The rear end of the wire 31 is attached to the outer end of a lever 35 projecting from the rudder tab 1, which is hingedly attached at its forward end to a rear portion of the rudder 2. By reason of the distance between the clamp 34, which is attached to a fixed portion of the airplane, and the tab end of the cable 31, the sheath and wire combination 30 and 31 have sufficient free length between clamp 34 and lever 35 so that movements of the rudder 2 about its pivot (indicated at 36 in Figure 2) will not affect the annular relation of the tab 1 with the rudder 2.

In the construction shown in Figure 3 the shaft 40 upon which the rudder tab 1 is fixed and pivoted to the rear portion of the rudder 2 has a pinion gear 41 affixed for rotation therewith and engaged by a rack 42 which is guided for sliding movement in a guide 43 fixedly mounted in the rudder 2. The rear end of the sheath 30 is fixed with respect to the rudder 2 by a clamp 44 adjacent the rudder pivot 36 and the rear end of the wire 31 is attached to the forward end of the rack 42 where it protrudes through the guide 43. Thus a movement of the wire 31 in either direction causes the rack 42 to turn in the same relative direction with respect to the rudder as does the lever 35 of Figure 2.

It is to be understood that these particular methods of preventing a change in the relationship between the tab 1 and the rudder 2 due to movements of the rudder are shown by way of example only, and that other devices within the knowledge of those skilled in the art may be used for this purpose, such as for instance one of the type shown in the Patent 2,097,996, issued November 2, 1937, to A. G. Butler. The rudder tab control system shown in that patent is actuated by two control cables normally wound around a drum located in the cockpit, and due to the low ratio of transverse movement of the sprocket upon the worm, the drum in the cockpit must be rotated through a comparatively large arc to move the tab. This ratio can be changed to increase the ratio of movement of the sprocket and tab if this system is used to connect the rudder tab to the aileron control, as will be understood. If two cables are used to actuate the rudder tab as in the Butler patent, each cable may be attached to two parts of the control cable 27 which move simultaneously in opposite directions as will be understood.

My improved control system, wherein the rudder tab is connected for simultaneous operation with the ailerons in order to deflect the rudder in the proper direction without the use of the rudder pedals furnishes means whereby perfect co-ordination in movement of the rudder and ailerons is obtained. The conventional rudder control system remains operative and may be used at any time that the pilot desires, in which case the forces needed to move the rudder by actuating the rudder bar will be reduced due to the simultaneous forces exerted by the rudder tab if the ailerons are simultaneously used. At the same time the pilot has a conventional rudder system which is useful for certain maneuvers not requiring movement of the airlerons, or for other movements requiring the use of more rudder than would be applied by the forces exerted by the rudder tab. Thus under normal flying conditions the pilot may forget his rudder control if he so desires while at the same time having the coordinated connection between the ailerons and rudder. While I have, in my illustrated embodiment, shown manual controls for the ailerons and a tab control for the rudder, it is within the scope of my invention to have manual control of the rudder and tabs on the ailerons so that the movement of the ailerons would be responsive to deflections of the tabs thereon which would be connected to the rudder control for positive movement as the rudder is manually deflected.

It is also within the scope of my invention that my rudder tab control be used in conjunction with the aileron or lateral control system in those types of airplane controls wherein the same control surfaces act both as ailerons and as elevators, as in the Patent 1,600,671, issued September 21, 1926, to G. T. R. Hill.

The invention may be embodied in other specific forms without departing from the spirit and essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim as my invention:

1. An airplane control system comprising ailerons and a rudder or the like, means for positively moving said ailerons, and means for positively moving said rudder, a rudder tab mounted on said rudder, and operating means for said rudder tab connected to the actuating means for said ailerons.

2. In an aircraft control system comprising ailerons, elevators, and a rudder, means for positively actuating said ailerons, means for positively actuating said rudder, means for positively actuating said elevators, a rudder tab mounted on said rudder, and means connecting said rudder tab to the actuating means for said ailerons for simultaneous movement of said rudder tab and ailerons.

3. A control system for an airplane comprising a first movable surface operable to control the movements of the airplane about the longitudinal axis, a second control surface operable to control the movement of said airplane about a vertical axis, an auxiliary surface mounted on said second control surface comprising a tab adjacent its trailing edge, means for actuating said first control surface, separate means for actuating said second control surface, and means connecting said auxiliary control surface to the actuating means for said first control surface for simultaneous movement therewith, whereby said auxiliary control surface is operated simultaneously with said first control surface.

4. An airplane control system comprising ailerons and a rudder, means for positively actuating said ailerons, means for positively actuating said rudder, a rudder tab mounted on said rudder, and operating means for said rudder tab connected to the actuating means for said ailerons in such manner that when the ailerons are inclined for a right bank the rudder tab is moved to the left and vice versa.

5. An airplane control system comprising ailerons and a rudder, means for positively actuating said ailerons, means for positively actuating said rudder, a rudder tab mounted on said rudder, and operating means for said rudder tab connected to the actuating means for said ailerons, said operating means retaining the angular relation between said tab and rudder irrespective of movements of said rudder.

6. A control system for an airplane, comprising a first movable control surface operable to control the movements of the airplane about a first axis, a second movable control surface operable to control the movement of the airplane about a second axis, an auxiliary surface movably mounted on said second movable control surface comprising a tab adjacent its trailing edge, means for actuating said first movable control surface, separate means for actuating said second movable control surface, and means connecting said auxiliary control surface to said actuating means for said first control surface for simultaneous movement therewith, whereby said auxiliary control surface is operated simultaneously with said first control surface.

7. A control system for an airplane, comprising a first movable control surface operable to control the movements of the airplane about its longitudinal axis, a second movable control surface operable to control the movement of the airplane about its vertical axis, means for actuating said first movable control surface, separate means for actuating said second movable control surface, an auxiliary control surface movably mounted upon one of said control surfaces comprising a tab adjacent its trailing edge, and means connecting said auxiliary control surface to the actuating means for the other of said movable control surfaces for simultaneous movement therewith, whereby said auxiliary control surface is operated simultaneously with said other movable control surface.

RALPH L. COPELAND.

REFERENCES CITED

The following references are of record in the file of this patent:

UNITED STATES PATENTS

| Number | Name | Date |
|---|---|---|
| 1,492,006 | Tarbox | Apr. 29, 1924 |
| 2,379,999 | Tydon | July 10, 1945 |

FOREIGN PATENTS

| Number | Country | Date |
|---|---|---|
| 323,881 | Germany | Aug. 11, 1920 |